United States Patent
Walter et al.

(10) Patent No.: US 8,523,021 B2
(45) Date of Patent: Sep. 3, 2013

(54) FEEDING DEVICE PARTICULARLY FOR POWDERED MATERIALS INTO A DEVICE PROCESSING THE SAME

(75) Inventors: Wolfgang Walter, Aalen (DE); Robert Rein, Nuremberg (DE)

(73) Assignee: Leistritz Extrusionstechnik GmbH, Nuremberg (DE)

( * ) Notice: Subject to any disclaimer, the term of this patent is extended or adjusted under 35 U.S.C. 154(b) by 111 days.

(21) Appl. No.: 13/266,410

(22) PCT Filed: Apr. 23, 2010

(86) PCT No.: PCT/EP2010/002514
§ 371 (c)(1),
(2), (4) Date: Oct. 26, 2011

(87) PCT Pub. No.: WO2010/124822
PCT Pub. Date: Nov. 4, 2010

(65) Prior Publication Data
US 2012/0037665 A1 Feb. 16, 2012

(30) Foreign Application Priority Data

Apr. 29, 2009 (DE) .......................... 10 2009 019 144

(51) Int. Cl.
*B65D 88/62* (2006.01)
(52) U.S. Cl.
USPC ........................... 222/203; 222/214; 222/413
(58) Field of Classification Search
USPC ............. 222/52, 63, 198, 196, 202, 203, 214, 222/224, 225, 233, 234, 413; 198/533, 671; 366/114, 186, 332–335

IPC ............ B29C 47/10; B65D 88/58,88/60, 88/62, B65D 88/66; G01F 13/00
See application file for complete search history.

(56) References Cited

U.S. PATENT DOCUMENTS

| | | | | | |
|---|---|---|---|---|---|
| 1,649,362 | A | * | 11/1927 | Nagel | 141/12 |
| 1,752,085 | A | * | 3/1930 | Hinkle | 222/210 |
| 2,646,905 | A | * | 7/1953 | Vincent | 222/200 |
| 2,732,099 | A | * | 1/1956 | Davis | 222/1 |
| 2,782,963 | A | * | 2/1957 | Erdmenger | 222/227 |
| 3,045,717 | A | * | 7/1962 | Vogt | 141/12 |
| 3,346,917 | A | * | 10/1967 | Lennox | 425/145 |
| 3,363,806 | A | * | 1/1968 | Blakeslee et al. | 222/638 |
| 5,160,016 | A | * | 11/1992 | Moksnes | 198/533 |
| 5,215,228 | A | * | 6/1993 | Andrews et al. | 222/203 |
| 6,312,151 | B1 | | 11/2001 | Pendleton | |
| 6,382,470 | B1 | * | 5/2002 | Hu et al. | 222/203 |
| 6,889,874 | B2 | * | 5/2005 | Vohwinkel | 222/198 |
| 8,181,568 | B1 | * | 5/2012 | Hofman et al. | 100/35 |
| 2008/0272151 | A1 | * | 11/2008 | Eccarius et al. | 222/214 |

FOREIGN PATENT DOCUMENTS

| | | |
|---|---|---|
| DE | 2062630 A | 6/1972 |
| DE | 3925265 | 1/1991 |
| EP | 0411369 | 2/1991 |
| FR | 2749823 A | 12/1997 |

(Continued)

*Primary Examiner* — Kevin P Shaver
*Assistant Examiner* — Patrick M Buechner
(74) *Attorney, Agent, or Firm* — Lucas & Mercanti, LLP

(57) ABSTRACT

A feeding device, particularly for feeding powdered materials into a device processing the same, in particular an extruder, the feeding device including a housing with a receiving region for receiving the material, which is movable laterally over at least one flexible wall, which is movable by at least one moving mechanical element acting thereon, wherein the element is movable along the wall. The wall exterior has bumps, is moved via the element, and/or the element is non-round in its motion.

13 Claims, 3 Drawing Sheets

(56) References Cited

FOREIGN PATENT DOCUMENTS

| | | |
|---|---|---|
| FR | 2794857 A | 12/2000 |
| GB | 1254059 A | 11/1971 |
| JP | 59118512 U | 8/1984 |
| SU | 986835 A | 1/1983 |
| SU | 1000765 A | 2/1983 |
| SU | 1265097 A1 * | 10/1986 |
| SU | 1381037 A | 3/1988 |
| WO | 0138172 A | 5/2001 |

* cited by examiner

FEEDING DEVICE PARTICULARLY FOR POWDERED MATERIALS INTO A DEVICE PROCESSING THE SAME

TITLE OF THE INVENTION

The present application is a 371 of International application PCT/EP2010/002514, filed Apr. 23, 2010, which claims priority of DE 10 2009 019 144.5, filed Apr. 29, 2009, the priority of these applications is hereby claimed and these applications are incorporated herein by reference.

BACKGROUND OF THE INVENTION

The invention relates to a feeding device particularly for powdered materials into a device processing the same, in particular an extruder, comprising a housing having a receiving region for receiving the materials, which has at least one flexible wall at the side, which is movable by means of at least one moving mechanical element acting on the said wall.

Such a feeding device, frequently also known as a side-loading apparatus, is used in particular in the area of processing granular or powdered materials for the purpose of feeding the respective material in a metered manner to a downstream processing device, conventionally a single- or multiple-screw extruder. The feeding device to this end has a housing, frequently in the form of a hopper or trough into which the material is introduced. The receiving region opens above a conveyor device, conventionally a feed screw or a double screw, via which the material is conveyed longitudinally and is fed in a metered manner to the extruder.

Particularly in the feeding of powdered materials it can arise that the powdered material sticks to the walls of the receiving region and thus continuously reduces the outlet cross-section of the receiving region to the conveyor screws because this region becomes blocked. This results in less material passing into the conveyor screw region, so that consequently less material can be metered in. In order to counteract this it is known to provide the receiving region with at least one flexible wall at the side and to allocate to this wall a mechanical element acting on its exterior, via which element the wall is intermittently moved, i.e. deformed, so that material adhering to it falls off due to the wall's deformation, A mechanical element of this type known in the prior art is formed as a paddle, i.e. a flat plate-like component, which is pivotably mounted about a horizontal axis extending parallel to the wall and which can be pivoted via a corresponding drive. During this pivoting motion it is moved against the flexible wall, presses the wall slightly inward, and deforms the same so that any material clinging thereto falls off. Although in this way any adhesion of material can be to some extent prevented, the mechanical complexity is considerable. Furthermore, as this involves rather slow and harmonically progressing wall deformation due to the relatively slowly effected pivoting motion, substantial detachment of the material cannot always be ensured.

SUMMARY OF THE INVENTION

The invention is therefore based on the problem of indicating a feeding device which permits improved material detachment.

To solve this problem it is provided according to the invention that the element is movable along the wall, which is provided on its exterior with bumps over which the element is moved, and/or the element is non-round in its motion.

The invention is based on the notion of moving or deforming the wall as it were in a shaking manner by intentionally providing bumps or asymmetries of the components acting on one another, in particular the moving element and the wall exterior, in order thus to detach the material as it were by shaking or hitting or vibrating motion. To this end, two different embodiments of the invention are conceivable. According to a first embodiment, the wall exterior is provided with bumps, preferably in the form of elongate projections which are formed on the exterior of the wall preferably of a flexible synthetic material such as rubber or the like. The element, which preferably rotates, but in this embodiment of the invention does not have to rotate, is moved over these bumps. This means that the element as it were "rattles" over these bumps, during which movement, due to the permanent running up and down over the projections, the wall is compulsorily deformed and this leads to a virtual shaking movement. Since a large number of these bumps are provided over the wall area, e.g. 10 or 20 projections extending in parallel, along which or over which the element passes, during a single movement of the element, a large number of shaking movements are necessarily produced which afford excellent detachment. The frequency of the deformation or shaking movement depends on the speed of movement of the element. The faster the element moves, the faster the wall movement and vice versa.

In addition or alternatively to the formation of the wall exterior with bumps, it is also conceivable that in its motion the rotary element itself is formed non-round, i.e. polygonal for example. This too may achieve a corresponding wall deformation if the element moves rotarily along the wall and this is correspondingly deformed according to the particular geometry of the element.

The element moves preferably automatically, controlled via a corresponding drive motor, via which it is moved along a linear guide. It is also conceivable to use a pneumatic or hydraulic cylinder or even a spindle drive, on which a nut guiding the element runs. The element motion is controlled via a corresponding control device in which the motion periods can be fixed together with the motion speed according to requirement.

The bumps on the wall are, as already described, preferably formed as elongate projections which extend intentionally perpendicular to the direction of motion of the element. The element itself is preferably to be moved horizontally, since the conveyor screws lie horizontally and the receiving region stands perpendicular thereto. Accordingly the projections should extend vertically.

In this case, the element moved along the uneven wall may be rigid or rotary. In the case of a rigid embodiment of the element, this may be a peg or sliding shoe or the like, preferably formed with a rounded tip, which slides sufficiently well over the wall exterior. A rotary element is preferably formed as a simple roller.

The non-round element preferably has a corrugated exterior. This means that for example a round base form is provided, the exterior having a corrugated profile. A purely polygonal embodiment, e.g. 8-sided, is also conceivable.

In principle, it is advantageous if the element has a synthetic coating forming an exterior acting on the wall, which coating is formed of a material which has good adhesion to the wall material. This is because only by the friction between the element exterior and the wall exterior is the rotation of the element, which is not actively rotated, to be ensured. Advantageously, both in the wall material and in the synthetic coating sufficiently adhesive synthetic materials are used that they do not slide over one another but ensure a rotary motion. The synthetic coating is formed in the simplest manner as a ring which is mounted on a rotarily-mounted element part. Therefore in the centre the rotarily-mounted disc is provided on which the rubber ring is mounted, whether this is round if the wall itself is profiled, or whether this is non-round if the wall is not necessarily profiled. In the case of a polygonal embodiment, for example a polygonal rotarily mounted element is provided on which a rubber ring forming the exterior is mounted.

In order to be able to mount the element a simply as possible, this is advantageously disposed on a slide, which is mounted movably on a linear conveyor. To drive the slide, various embodiments are conceivable. On the one hand the slide itself may have a small motor which drives a gearwheel on the slide, the gearwheel meshing with a rack of the linear drive. However, a hydraulic or pneumatic cylinder is also conceivable which pushes the slide together with the element on the linear guide. Also the use of spring elements is conceivable which act on the slide and a stationary point and form restoring or tension forces for slide movement, as well as a threaded spindle which is rotated via a motor and on which a threaded nut revolves which is in turn connected to the slide.

Although it may even be sufficient only to provide one flexible wall, according to an advantageous embodiment of the invention at least one further flexible wall may be provided, preferably the wall opposite the first wall, which is allocated its own movable element, the wall and the element being formed in the same manner as the first wall and the first element. This means that the shaking motion according to the invention can be effected on two opposite walls so that any adhesion is completely ruled out.

Furthermore, advantageously a control device is provided via which the movement speed and ultimately the movement periods of the respective movable element can be set. This means that according to the material supplied the element motion can be adjusted to the particular material. If more grainy or granular material is being used, then generally there is no adhesion, so that the element does not have to be moved or only has to be moved very infrequently. This is unlike the processing of powdered material, where the element has to be moved more frequently.

To form the respective arrangement of the one or more walls in the receiving region, according to a development of the invention it is provided that the receiving region is laterally defined by means of an insert having a substantially rectangular cross-section and on which insert, consisting of a flexible material, the one or more walls are formed. This means that in the housing a similarly substantially rectangular aperture or recess is formed which defines the receiving region. Due to this rectangular form, it is also ensures that the one or two walls deformed by the element also extend flush, so that the element can be moved deformingly over the wall in a lateral linear motion. By using such an insert, which thus lines the receiving region fully on all four sides, the positioning of the walls is particularly simple.

In order in such an embodiment to bring the element simply into active combination with the respective flexible wall, as already described, the housing is provided with a recess defining the receiving region, and an aperture on the housing which penetrates the element leads to the or each flexible wall defining the receiving region. This means that on one or two opposing housing sides slots are provided through which the element engages on the exposed wall exterior.

Further advantages, features and details of the invention will appear from the examples described below and from the drawings which show:

DETAILED DESCRIPTION OF THE INVENTION

Figure 1:
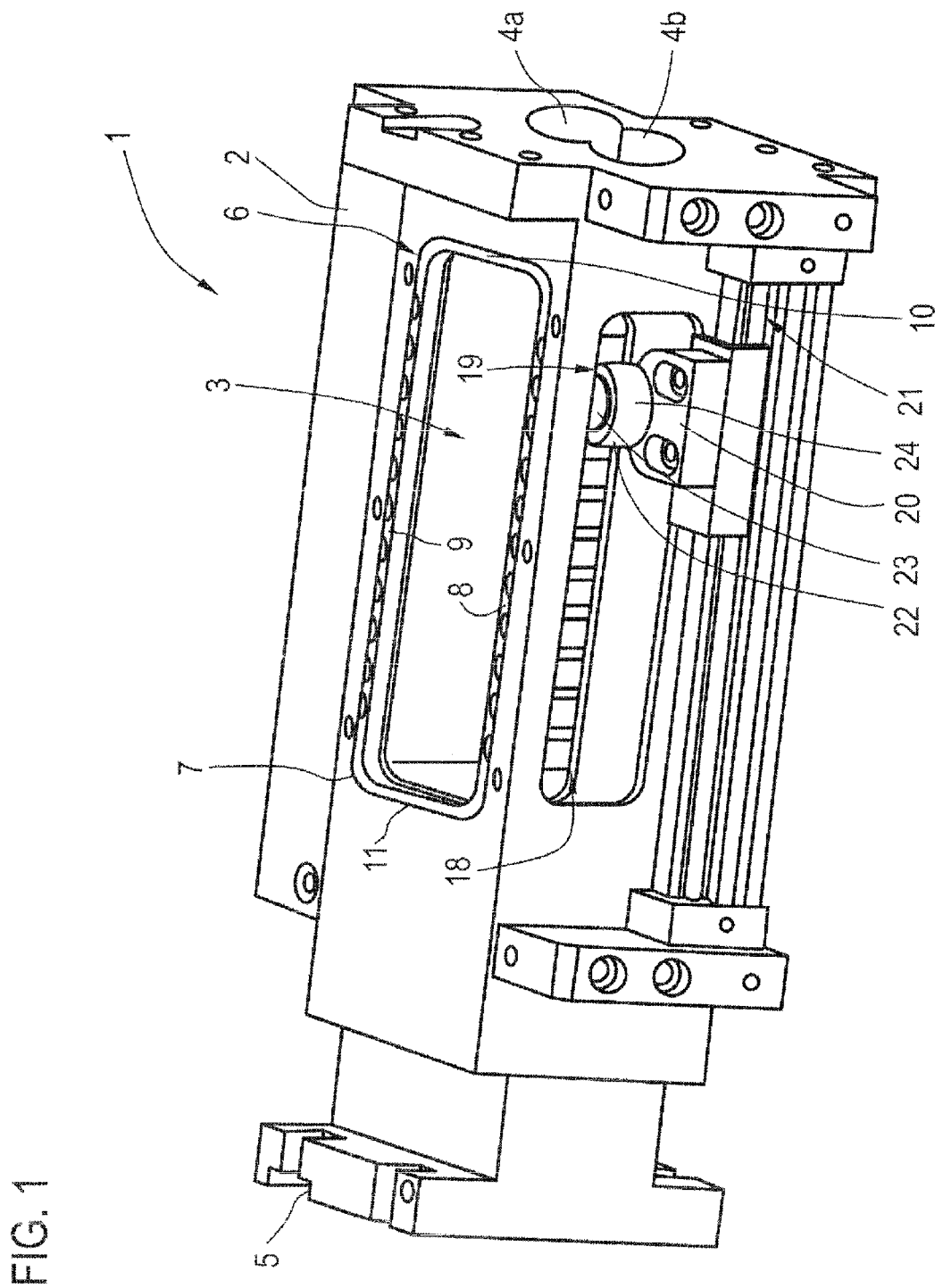
FIG. 1 a principle diagram of a feeding device according to the invention.

FIG. 1 shows a feeding device 1 according to the invention comprising a housing 2, in or on which a receiving region 3 is provided, which is for receiving a material to be fed via the feeding device. A hopper for example may be mounted on the housing 2, which hopper opens into the receiving region 3 and into which the material to be conveyed is introduced. To convey the material, in the example 2 shown, mutually meshing screws penetrating the housing 3 through appropriate bores 4a, 4h are used, which for the sake of clarity are not shown in more detail here. The screws are driven in rotation in a manner known per se via a motor flanged on to the housing 3, which motor conveys material falling from above over the receiving region 3 on to the screws in a longitudinal manner via the same and transports the material to the downstream extruder or the like which adjoins the connecting wall 5.

Figure 2:
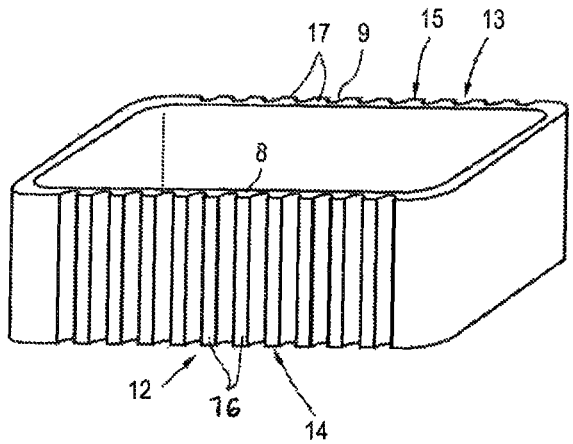
FIG. 2 a principle diagram of an insert having the flexible walls.
Figure 3:
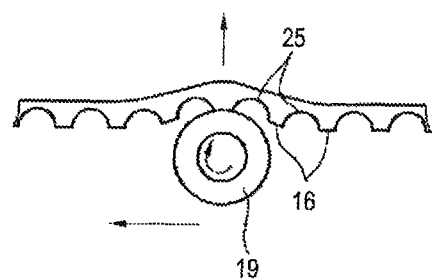
FIGS. 3 and 4 two views of the wall deformation upon movement of the element, the wall being provided with bumps and the element being round, and FIGS. 5 and 6 two views to represent the wall deformation, the wall being plane and the element being formed non-round.

The receiving region 3 is substantially rectangular in the example shown, to which end the housing has a recess 6 defining this shape into which an insert 7 is inserted, which consists of a sufficiently flexible synthetic material, e.g. a rubber. The insert 7 likewise has a substantially rectangular form, since it fully lines the recess 6 on all four sides. By the insert 7, two opposing flexible walls 8, 9 are formed. The material to be received and conveyed rests against these walls 8, 9 and also clearly the corresponding two other side walls 10, 11. The respective exterior 12, 13 of the respective wall 8, 9, see FIG. 2, is provided in this example with bumps 14, 15 in the form of projections 16, 17 which here extend vertically and parallel to one another. Thus in this case a type of corrugated or ribbed profile is formed on the respective wall exteriors, the bumps being also optionally rounded on their exterior, and their number and spacing being selectively chosen provided that they cooperate with the element to be described in the manner according to the invention.

This ribbed or corrugated profile on the respective wall exteriors serves to permit a virtual shaking wall deformation. To this end, on the housing 2, a respective aperture 18 is provided, and in FIG. 1 only the front aperture 18 is shown. This elongate, horizontally extending aperture leads into the region of the receiving portion 6, so that the respective wall exterior 12, 13 is left exposed.

To deform and shake the wall, a mechanical element 19 is provided, and each wall 8, 9 is allocated such a mechanical element 19. In the embodiment shown in FIG. 1, the element is formed as a wheel or roller which is mounted rotatably on a slide 20 which is moved longitudinally in turn over a linear guide 21 extending horizontally adjacent to the aperture 18. To move the slide 20 and therewith the element 19 on the linear guide 21, a drive motor and a gearwheel/rack drive, a hydraulic or pneumatic cylinder or a threaded spindle drive etc. may be provided. The respective drive is not shown here in more detail.

The actual arrangement is such that the element 19 is inserted into the aperture 18 or engages through the same and abuts with its exterior 22 the wall exterior 12. The element 19 consists of a wheel or roller 23 which is rotatably mounted on the slide on the slide and on which a ring 24 forming the exterior 22 composed of plastics material or rubber is mounted. With this ring 24 or its exterior 22 the element 19 presses against the exterior 12 of the wall 8, deforms the same slightly and presses it inwards.

Figure 4:
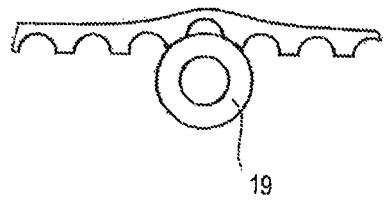

If then the element 19 is moved horizontally from left to right and back on the linear guide 21, the element 19 rolls along the exterior 12 of the wall 8. Since the exterior 12 is profiled by the projections 16, this necessarily leads to rolling of the element over the projections 16 and the valleys 25 located between them. This leads, as in FIG. 4, necessarily to a continuous local deformation of the wall, which however changes constantly due to the profiling, according to whether the element is rolling over a projection or over a valley located between two projections. This results in a type of shaking movement of the wall which is moved relatively strongly, so that any material adhering thereto is immediately detached from the inside of the wall. Since corresponding shaking takes place on both opposing walls 8, 9, the blocking of the receiving region with adhering material is advantageously avoided thereby.

Figure 5:
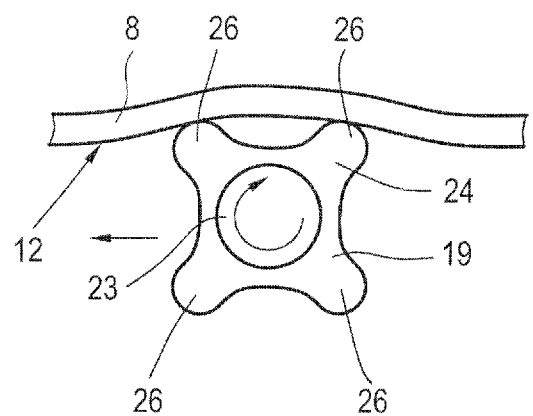
Figure 6:
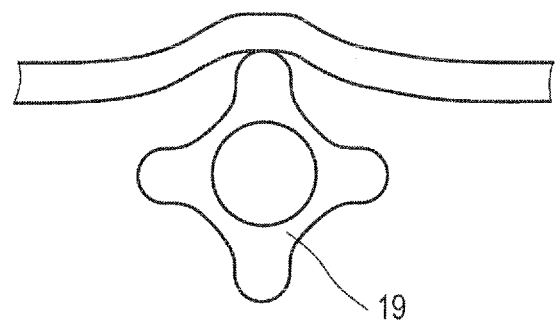

FIGS. 5 and 6 show an alternative embodiment of a "shaking device". There is also shown here a detail e.g. of the wall 8, whose exterior 12 is however plane, i.e. here no bumps in the form of projections are formed. For this reason, the element 19 is non-round, which can be realised simply again via a ring 24 mounted on the roller 23, which ring is profiled on the exterior. Due to the bump which is realised here via four projecting sections 26, it is possible (see FIGS. 5 and 6) to effect in the same way a shaking movement, since here too the flexible and resilient wall 8 is pressed inward or springs back out again more or less strongly according to the position of the element 19.

Alternatively to the realisation of the element profiling via the mounted ring 24, it is also conceivable to form the roller 23 polygonal, e.g. 4-, 6- or 8-sided and to mount a simple rubber ring which forms a good frictional exterior.

In the choice of materials from which the walls 8, 9 and the respective elements 19 or their plastics material or rubber outer faces are formed, it should be borne in mind that sufficiently high friction is produced between the materials, since the rotary motion of the element 19 does not take place actively but only due to friction upon pushing along the linear guide. 21

The invention claimed is:

1. A. feeding device for powdered materials into a device processing the materials, comprising: a housing having a receiving region for receiving the material which is movable laterally via at least one flexible wall; and at least one moving mechanical element acting on the wall to move the wall, wherein the element is movable along the wall, and the wall has an exterior with bumps over which the element is moved, and/or the element is non-round in its motion.

2. The feeding device according to claim 1, wherein the bumps on the wall are formed as elongate projections.

3. The feeding device according to claim 2, wherein the projections extend perpendicular to a direction of motion of the element.

4. The feeding device according to claim 1, wherein the element moved along the wall is rigid or rotary.

5. The feeding device according to claim 1, wherein the non-round element has a corrugated exterior.

6. The feeding device according to claim 4, wherein the element has a synthetic coating forming an exterior that acts on the wall.

7. The feeding device according to claim 6, wherein the element has a rotatably mounted part and the synthetic coating is formed by a ring mounted on the rotatably mounted part.

8. The feeding device according to claim 1, and further comprising a linear guide and a slide mounted on the linear guide, the element being disposed on the slide.

9. The feeding device according to claim 1, further comprising at least one further flexible wall and a further element movable along the further wall.

10. The feeding device according to claim 9, wherein the further wall is arranged opposite the wall.

11. The feeding device according to claim 1, further comprising a control device operative to set movement speed of the element.

12. The feeding device according claim 1, wherein the receiving region is laterally defined by an insert of substantially rectangular cross-section, the insert consisting of a flexible material and forming the wall.

13. The feeding device according to claim 1, wherein the housing has a recess defining the receiving region, in which the wall is disposed, wherein an aperture is provided in the housing so as to lead to the wall, the aperture penetrating the element.

* * * * *